(12) United States Patent
Maeiwa et al.

(10) Patent No.: US 7,800,626 B2
(45) Date of Patent: Sep. 21, 2010

(54) MAPPING DEVICE, MAPPING METHOD AND PROGRAM THEREOF

(75) Inventors: Tetsuji Maeiwa, Wakayama (JP); Shinji Yamamoto, Wakayama (JP)

(73) Assignee: Shima Seiki Manufacturing, Ltd., Wakayama (JP)

( * ) Notice: Subject to any disclaimer, the term of this patent is extended or adjusted under 35 U.S.C. 154(b) by 756 days.

(21) Appl. No.: 11/660,377

(22) PCT Filed: Aug. 10, 2005

(86) PCT No.: PCT/JP2005/014651

§ 371 (c)(1),
(2), (4) Date: Feb. 16, 2007

(87) PCT Pub. No.: WO2006/019022

PCT Pub. Date: Feb. 23, 2006

(65) Prior Publication Data

US 2008/0150956 A1    Jun. 26, 2008

(30) Foreign Application Priority Data

Aug. 20, 2004    (JP) .............................. 2004-241111

(51) Int. Cl.
*G09G 5/00* (2006.01)
(52) U.S. Cl. ....................................... 345/582; 345/583
(58) Field of Classification Search .......... 345/582–588
See application file for complete search history.

(56) References Cited

U.S. PATENT DOCUMENTS

| | | | |
|---|---|---|---|
| 4,888,713 A | 12/1989 | Falk | |
| 5,307,450 A | * 4/1994 | Grossman | .................... 345/423 |
| 5,615,318 A | 3/1997 | Matsuura | |
| 5,852,447 A | 12/1998 | Hosoya et al. | |

(Continued)

FOREIGN PATENT DOCUMENTS

JP    4-165473 A    6/1992

(Continued)

OTHER PUBLICATIONS

Wang et al., "An image-based texture mapping technique for apparel products exhibition and interior design", Displays Devices, vol. 24, No. 4-5, Dec. 1, 2003, pp. 179-186.

(Continued)

*Primary Examiner*—Xiao M Wu
*Assistant Examiner*—Charles Tseng
(74) *Attorney, Agent, or Firm*—Rothwell, Figg, Ernst & Manbeck, P.C.

(57) ABSTRACT

The center line and lines at the right and left end parts are inputted to a base image from which a texture image is to be mapped, and a position of the base image closest to the view point is inputted as a point closest to the user. Right side of the point closest to the user of the body is approximated by one quarter of circle, and the left side is approximated by another quarter of circle so as to generate an elliptical arc representative of the horizontal cross-sectional shape of the body. The texture image is then mapped to the body using that elliptical arc. Thus mapping of the texture image to the body can be performed easily.

8 Claims, 14 Drawing Sheets

U.S. PATENT DOCUMENTS

| | | | |
|---|---|---|---|
| 6,078,334 | A | 6/2000 | Hanaoka et al. |
| 6,260,000 | B1 | 7/2001 | Karasaki et al. |
| 6,268,865 | B1 * | 7/2001 | Daniels et al. .............. 345/582 |
| 2004/0049309 | A1 * | 3/2004 | Gardner et al. .............. 700/132 |
| 2007/0038421 | A1 * | 2/2007 | Hu et al. ......................... 703/6 |
| 2008/0150956 | A1 * | 6/2008 | Maeiwa et al. .............. 345/584 |

FOREIGN PATENT DOCUMENTS

| | | |
|---|---|---|
| JP | 6-28438 A | 2/1994 |
| JP | 10-302079 A | 11/1998 |
| JP | 11-134518 A | 5/1999 |
| JP | 11-203498 A | 7/1999 |

OTHER PUBLICATIONS

Yang et al., "Nonlinear Projection: Using Deformations in 3D Viewing", Computing in Science and Engineering, vol. 5, No. 2, Mar. 1, 2003, pp. 54-59.

Ng et al., "Computer graphics Techniques for Modeling Cloth", IEEE Computer Graphics and Applications, vol. 16, No. 5, Sep. 1, 1996, pp. 28-41.

Gordon et al, "Construction of curvilinear co-ordinate systems and applications to mesh generation", Int. Journal for Numerical Methods in Engineering, vol. 7, 1973, pp. 461-477.

* cited by examiner

MAPPING DEVICE, MAPPING METHOD AND PROGRAM THEREOF

CROSS REFERENCE TO RELATED APPLICATION

This application is a 35 USC §371 National Phase Entry Application from PCT/JP2005/014651, filed Aug. 10, 2005.

TECHNICAL FIELD

The present invention relates to a mapping device, mapping method and program thereof that are used in designing a textile product.

BACKGROUND ART

Japanese Patent Application No. 2678228 discloses designing of a knit, wherein an image of a designed knit is mapped onto an image of a mannequin to evaluate thus obtained image three-dimensionally.

Also, Japanese Patent Application Laid-Open No. H4-165473 discloses inputting an instruction point for adjusting the rate of change in pixel density during mapping.

Incidentally, in designing textile products, mapping is generally performed when mapping a texture onto an image of a body. For example, in order to perform mapping, it is necessary to create mesh patterns on an image of a body to issue an instruction as to which part of the texture is mapped onto a part of the body. The mesh patterns are inputted imagining the 3D space of the body so that the widths of the mesh patterns are narrow on the right and left sides of the body but wide at the center of the body, whereby the perspective of the body is expressed using the widths of the mesh patterns. However, it is difficult to imagine the 3D space, and thus it is difficult to perform mapping. Particularly, if the image of the body does not face forward but faces diagonally, it is difficult to input mesh patterns for mapping.

A fundamental object of the present invention is to provide a mapping device, mapping method and program thereof that are capable of performing mapping realistically while fixing a relationship between a central part of a mapping image and a central part of a base image to be mapped, even if a mannequin, a human body or other mapping target in the base image faces diagonally, and at the same time inputting mapping conditions easily.

An additional object of the present invention is to make it possible to input only one nearest point.

Another object of the present invention is to make it easier for a user to adjust a change in a pixel density of a mapped image between the vicinity of the nearest point and the vicinity of each of both ends.

Yet another object of the present invention is to make it possible to confirm the mapping conditions easily even when mapping an image whose perspective is difficult to confirm.

Yet another object of the present invention is to provide a concrete configuration for generating the mapping conditions.

DISCLOSURE OF THE INVENTION

The mapping device of the present invention is a device for generating a relationship between a mapping image and a base image as a mapping condition in order to map the mapping image onto the base image, and mapping the mapping image onto a mapping area of the base image by means of mapping means in accordance with the generated mapping condition, the mapping device comprising: means for storing a centerline of the mapping area of the base image; means for receiving and then storing at least one input of a nearest point that appears on the nearest side in the mapping area when viewed from a user of the mapping device; means for obtaining positions of both ends of the mapping area; and mapping condition generating means for generating the mapping condition for mapping the mapping image onto the mapping area so that a pixel density of the mapping image becomes the lowest in the vicinity of the nearest point, that a centerline of the mapping image is mapped onto the vicinity of the centerline of the mapping area, and that the pixel density of the mapping image becomes the highest at the both ends.

It is preferred that the mapping device be provided with means for extending the inputted nearest point by the length of the mapping area in parallel with the centerline of the mapping area, to obtain a nearest line.

It is also preferred that the mapping device be provided with input means for inputting an instruction value for adjusting the rate of change in the pixel density obtained under the mapping condition.

It is also preferred that the mapping device be provided with storage means for storing a test image, and that the mapping means map the test image onto the mapping area in accordance with the generated mapping condition, before mapping the mapping image.

It is particularly preferred that the mapping condition generating means generate an elliptic arc such that the elliptic arc protrudes most toward the user's perspective in the vicinity of the nearest point, that the both ends of the mapping area are located on the farthest sides when viewed from the user side, and that a long axis of the elliptic arc is tilted toward a surface of the base image in accordance with an interval between the centerline of the mapping area and the nearest point; and that the mapping condition generating means map a point in the vicinity of the centerline of the mapping area onto the vicinity of the center of the elliptic arc, and generate a plurality of points for dividing the section between the mapped point in the vicinity of the centerline of the mapping area and each of both ends of the elliptic so that perimeters along the surface of the elliptic arc become constant.

The mapping method of the present invention is a method for generating a relationship between a mapping image and a base image as a mapping condition in order to map the mapping image onto the base image, and mapping the mapping image onto a mapping area of the base image by means of mapping means in accordance with the generated mapping condition, the mapping method comprising the steps of: storing a centerline of the mapping area of the base image and at least one nearest point that appears on the nearest side in the mapping area when viewed from a user of the mapping device and obtaining positions of both ends of the mapping area; and generating the mapping condition for mapping the mapping image onto the mapping area so that a pixel density of the mapping image becomes the lowest in the vicinity of the nearest point, that a centerline of the mapping image is mapped onto the vicinity of the centerline of the mapping area, and that the pixel density of the mapping image becomes the highest at the both ends.

The mapping program of the present invention is a program for generating a relationship between a mapping image and a base image as a mapping condition in order to map the mapping image onto the base image, and mapping the mapping image onto a mapping area of the base image by means of mapping means in accordance with the generated mapping condition, the mapping program comprising: a command for storing a centerline of the mapping area of the base image; a command for receiving and then storing at least one input of a nearest point that appears on the nearest side in the mapping area when viewed from a user of the mapping device; a command for obtaining positions of both ends of the mapping area; and a mapping condition generating command for generating the mapping condition for mapping the mapping image onto the mapping area so that a pixel density of the mapping image becomes the lowest in the vicinity of the nearest point, that a centerline of the mapping image is mapped onto the vicinity of the centerline of the mapping area, and that the pixel density of the mapping image becomes the highest at the both ends.

According to the present invention, the use can simply generate the mapping condition (mapping function) by inputting the centerline of the mapping area on the base image and the nearest point. In this mapping, the centerline of the mapping image is mapped onto the centerline that is inputted by the user on the base image, and the relationship between these centerlines can be secured. Furthermore, in a section located nearest to the user, the mapping is performed using the nearest point so that the pixel density of the mapping image becomes the lowest and the pixel density in the vicinity of the both ends of the mapping area becomes the highest, thus the mapping can be performed with appropriate perspective. Moreover, even if a target of attachment on the mapping image on the base image faces diagonally, the mapping can be performed easily. Therefore, the mapping can be easily used in designing a textile product and the like.

Here, when the nearest point is extended parallel to the centerline of the mapping area, the user may simply input, for example, one nearest point.

Here, the user can easily adjust the perspective by adjusting the rate of change in pixel density obtained when mapping the mapping image onto the base image.

Also, by mapping the test image before mapping the mapping image in accordance with the generated mapping condition, the adequacy of the mapping condition can be easily determined even when mapping an image whose perspective is difficult to find.

It is preferred that the mapping condition be defined using the elliptic arc. The elliptic arc is tilted such that it protrudes toward the user side most at a position corresponding to the nearest point, and a point in the vicinity of the mapping area is mapped onto the vicinity of the center of the elliptic arc, whereby the space between the point in the vicinity of the centerline and the vicinity of each of both ends of the elliptic arc is divided into a plurality of sections. The perimeter along the surface of the elliptic arc is made constant throughout all divided sections. In this manner, the mapping condition can be created.

EXPLANATION OF REFERENCE NUMERALS

Figure 1:
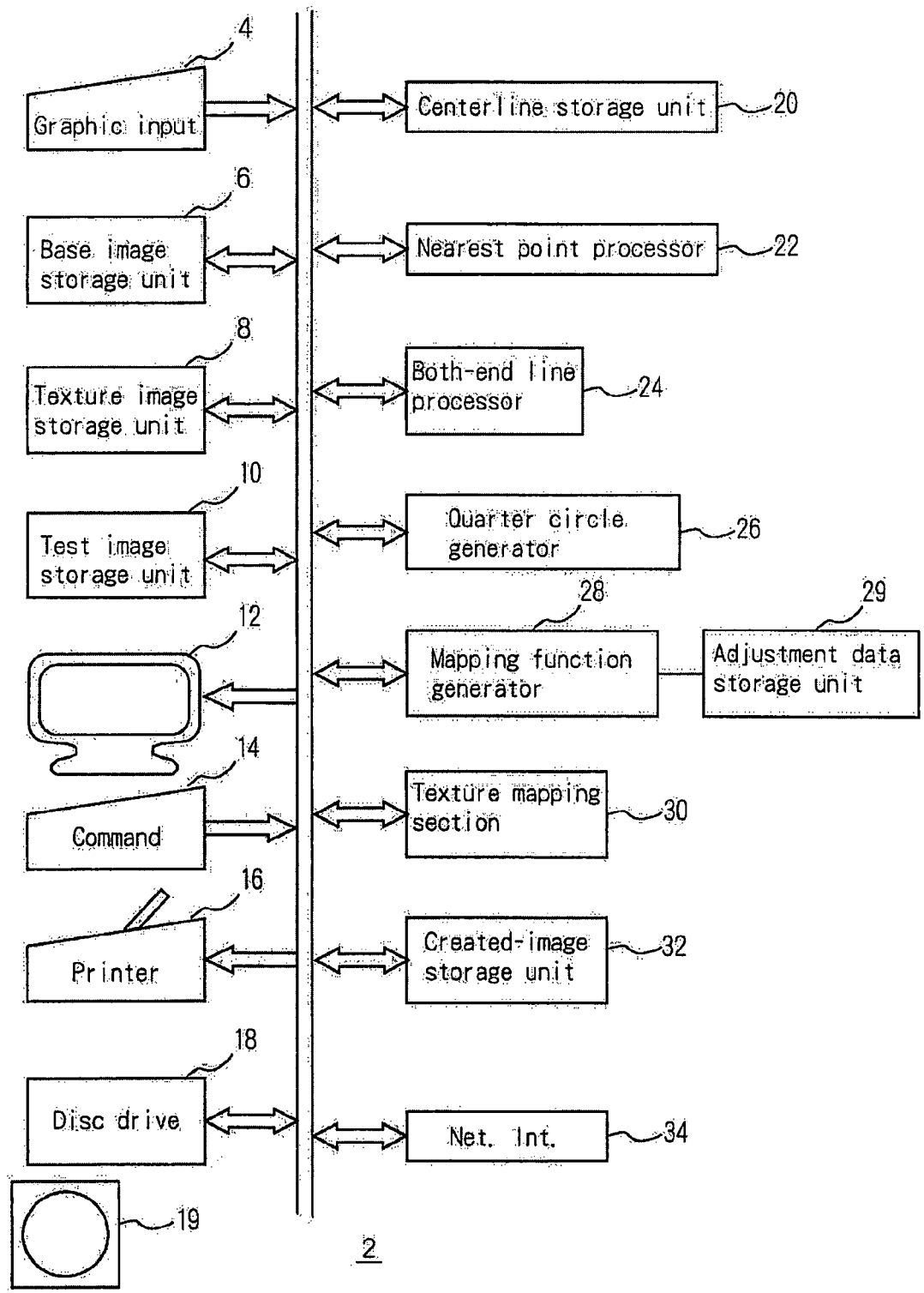
FIG. 1 is a block diagram of a mapping device of an embodiment.

2: mapping device
4: graphic input
6: base image storage unit
8: texture image storage unit
10: test image storage unit
12: display
14: command input
16: printer
18: disk drive
19: storage medium for mapping program
20: centerline storage unit
22: nearest point processor
24: both-end line processor
26: quarter circle generator
28: mapping function generator
29: adjustment data storage unit
30: texture mapping section
32: created-image storage unit
34: network interface
50: centerline storage command
51: both-end line processing command
52: nearest line processing command
53: quarter circle generating command
54: mapping function generating command
55: adjustment data processing command
56: texture mapping command
61: texture image
62: base image
64: elliptic arc
65, 66: quarter circle
68, 69: centerline
70: nearest point
71: left side
72: right side
73: left end texture image
74: right end of texture image
76, 80: elliptic arc
77, 78: quarter circle

82: long axis
r1, r2: radius of quarter circle
d: distance between centerline of base image and nearest point
θ: angle formed by long axis and texture image or mapping image
φ: angle corresponding to the distance between centerline of texture image and nearest point

BEST MODE FOR CARRYING OUT THE INVENTION

The best mode for carrying out the present invention is described hereinafter.

FIG. 1 through FIG. 17 show an embodiment and modifications thereof. In these figures, 2 indicates a mapping device having a graphic input 4 such as a pen, mouse, joystick or track ball. A base image storage unit 6 stores a base image, a texture image storage unit 8 stores a texture image, and a test image storage unit 10 stores a test image for determining the quality of a mapping condition.

It should be noted in this specification that the base image is an image onto which an image is mapped, while the texture image is an image to be mapped. The test image is sometimes called "test pattern", and is preferably an image with which evaluation can be performed easily as to how each part of the test image such as a mesh pattern or zigzag pattern is mapped; however, the test image may not be used. 12 is a display such as a color display, 14 is a command input such as a keyboard or mouse, 16 is a printer such as a color printer, and 18 is an appropriate disk drive. 19 is a storage medium for storing a mapping program.

20 is a centerline storage unit that generates and stores a centerline of the base image and further stores a centerline of the texture image. The base image is an image showing, for example, a human body or a mannequin wearing clothes such as a sweater, a dress, a cardigan, a hat, a pair of socks, a pair of slacks or the like. The base image may be an image of a sheet of a car or the like. In such base image, an area for mapping the texture image is a mapping area, and, in the case of the present embodiment, for example, the front body corresponds to the mapping area. The centerline on the base image is inputted from, for example, the graphic input 4, and the centerline of the texture image may be inputted from the graphic input 4 by a user. When there is no input, the center of the texture image is taken as a default value of the centerline.

A nearest point processor 22 receives, from the graphic input 4, an input of a point in the mapping area of the base image, which can be seen on the nearest side of the user. When the user inputs a plurality of nearest points parallel to, for example, the centerline, these points may be connected to obtain a nearest line. When, for example, only one nearest point is inputted, the nearest point is extended over the length of the mapping area in parallel with the centerline of the base image, to obtain the nearest line. The nearest point processor 22 performs various processes including generating a nearest line from an inputted nearest point, and stores the generated nearest line.

A both-end line processor 24 generates lines at the both end sections of the base image, i.e., lines along the left side and the right side of the body, and stores these lines after these lines are deformed by the user. When generating the both-end lines, an initial value of each of the both-end lines is generated on each side of the centerline of the mapping area so as to be in parallel with, for example, the centerline of the mapping area. Then, the user moves and deforms the both-end lines by means of the graphic input 4 to cause the both-end lines to follow the both sides of the body respectively, and stores thus obtained lines in the both-end line processor 24. These both-end lines can also be generated automatically from the base image by means of image recognition and, in this case, the both-end lines are obtained by means of image recognition instead of storing the both-end lines.

The centerline, nearest point, both-end lines and the like described in the present embodiment may be precise enough to create a realistic image having perspective by mapping the texture image onto the base image. Therefore, the centerline does not necessarily have to be a proper centerline, and the nearest point also does not necessarily have to be a proper nearest point. The both-end lines also do not literally have to be lines that follow the both sides of the body, thus, in this case, the both-end lines may protrude out of the sides to the right and left or may be located slightly inward of the sides.

A quarter circle generator 26 generates two quarter circles that are bounded by points following the nearest line on the base image, and one end of each of the quarter circles is located on each of the both-end lines. It should be noted here that each quarter circle does not literally have to be a circular arc having a 90-degree center angle, thus a circular arc having a larger or smaller center angle may be used. Also, the purpose of generating the two quarter circles is to generate an elliptic arc, thus the elliptic arc may be generated in place of the two quarter circles. The quarter circle generator 26 generates a plurality of pairs of quarter circles or elliptic arcs along the nearest line on the base image or along the centerline. The elliptic arc does not necessarily have to be a proper elliptic arc, thus the purpose of using the quarter circles is to simply generate an approximate elliptic arc.

A mapping function generator 28 generates a mapping function for mapping the texture image onto the base image. In this embodiment, mesh mapping is used for the mapping, and the texture image is divided into, for example, equal intervals by means of a plurality of mesh patterns. Similarly, the base image is divided by means of a plurality of mesh patterns so that pixels of each mesh pattern on the texture image is mapped onto pixels of each mesh pattern of the base image and that the space between these mesh patterns is interpolated. The mapping function indicates such mapping condition.

The mapping functions differ according to the positions along the centerline of the base image or texture image, and a plurality of mapping functions are generated along the centerline. An adjustment data storage unit 29 displays, on the display 12, graphic user interfaces such as a slide bar, wherein when the user operates the bar using the command input 14 or the like, parameters for mapping (adjustment data) can be inputted. The adjustment data is for determining whether a change of the pixel density of the texture image becomes significant or less significant on the base image when the texture image is mapped onto the base image. Accordingly, the adjustment data storage unit 29 can adjust the mapping of the texture image so that relatively even pixel density is obtained or that the change of the pixel density becomes significant. Therefore, the user can easily adjust the degree of the perspective.

A texture mapping section 30 maps the texture image or test image onto the mapping area of the base image in accordance with the mapping functions. A created-image storage unit 32 stores an image created by the mapping, displays this image on, for example, the display 12, and outputs the image to the printer 16 or the disk drive 18. 34 is a network interface that connects the mapping device 2 to a LAN, Internet and the like.

Figure 2:
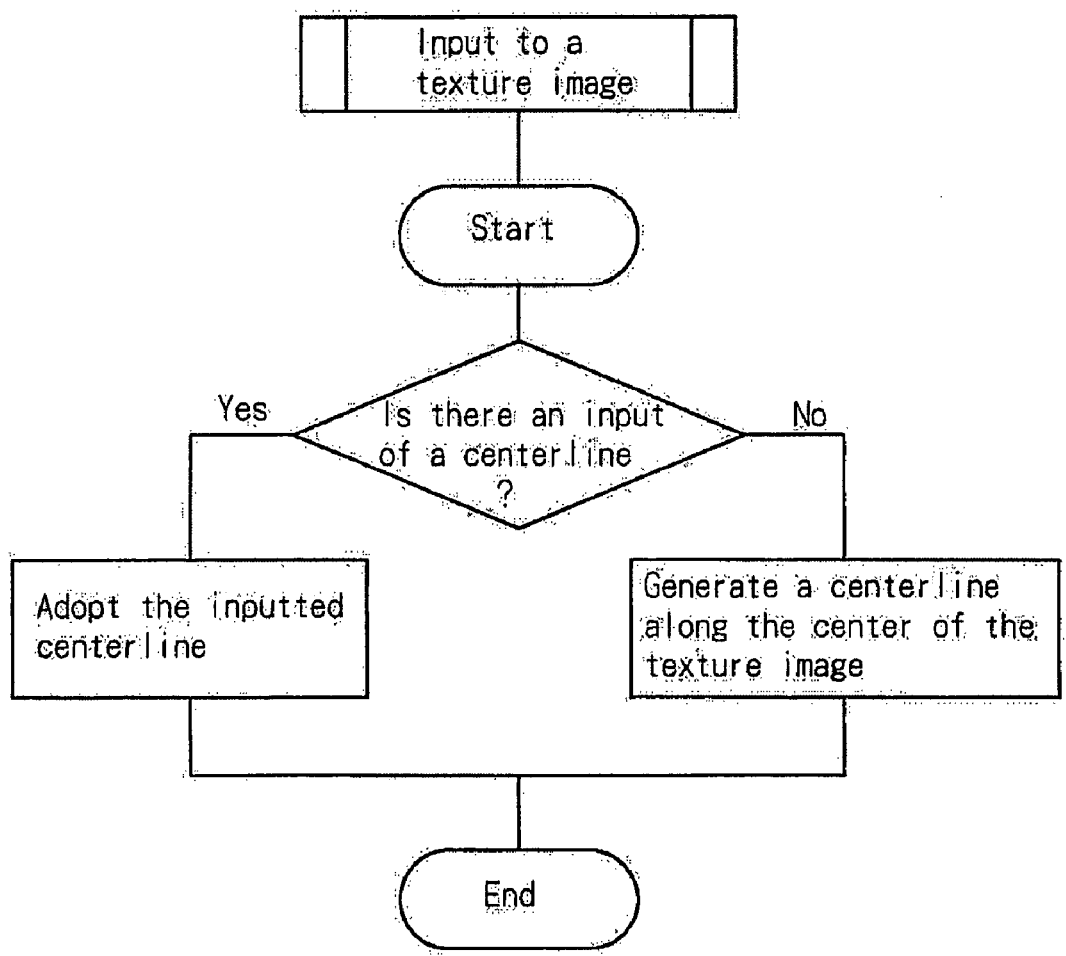
FIG. 2 is a flowchart showing input to a texture image in the embodiment.

FIG. 2 shows an algorithm of an input to the texture image. Checking is performed as to whether the centerline of the texture image has been inputted, and if the centerline is inputted, the centerline is stored. If not, a centerline is created along the center of the texture image, and then the created centerline is stored.

Figure 3:
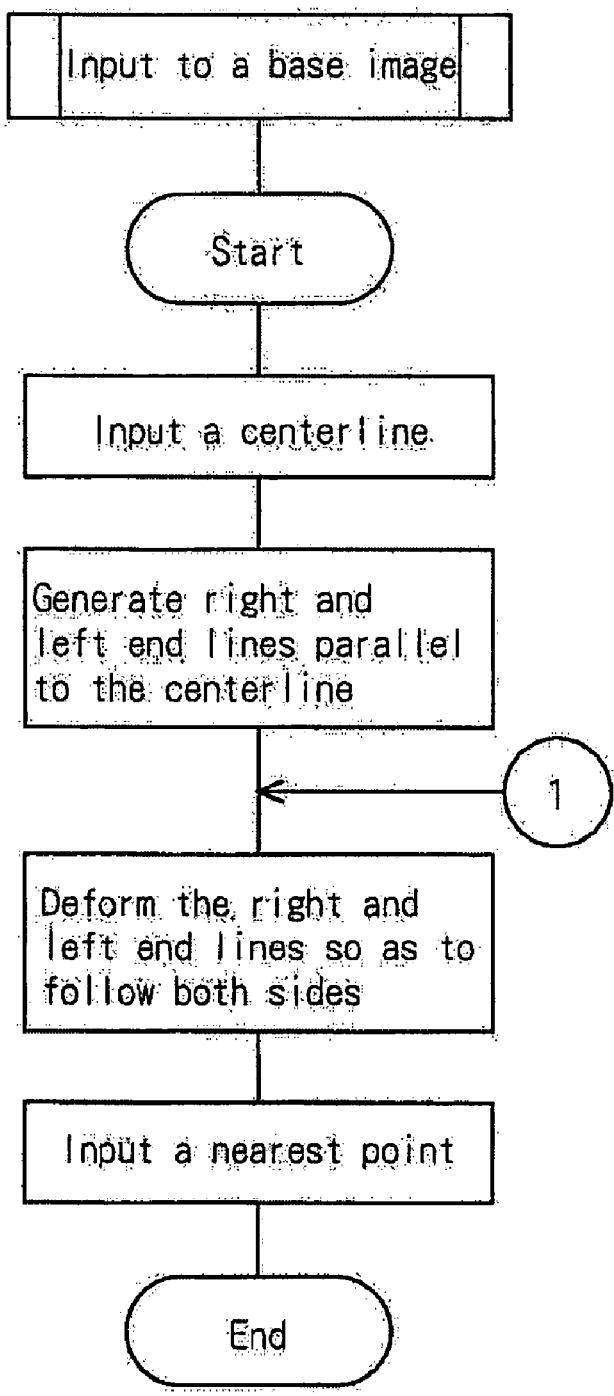
FIG. 3 is a flowchart showing input to a base image in the embodiment.

FIG. 3 shows an input to the base image, wherein, for example, the user inputs the centerline of the mapping area from the graphic input. Next, end lines are generated on the right and left sides parallel to the centerline. The end lines that are automatically generated generally do not fit to the both sides of the body, thus the user deforms the end lines using the graphic input or the like so that the right and left end lines follow the both sides of the body. The user then inputs the nearest point. If one nearest point is inputted, the nearest point is extended parallel to the centerline as described above, and this extended point is obtained as the nearest line.

Figure 4:
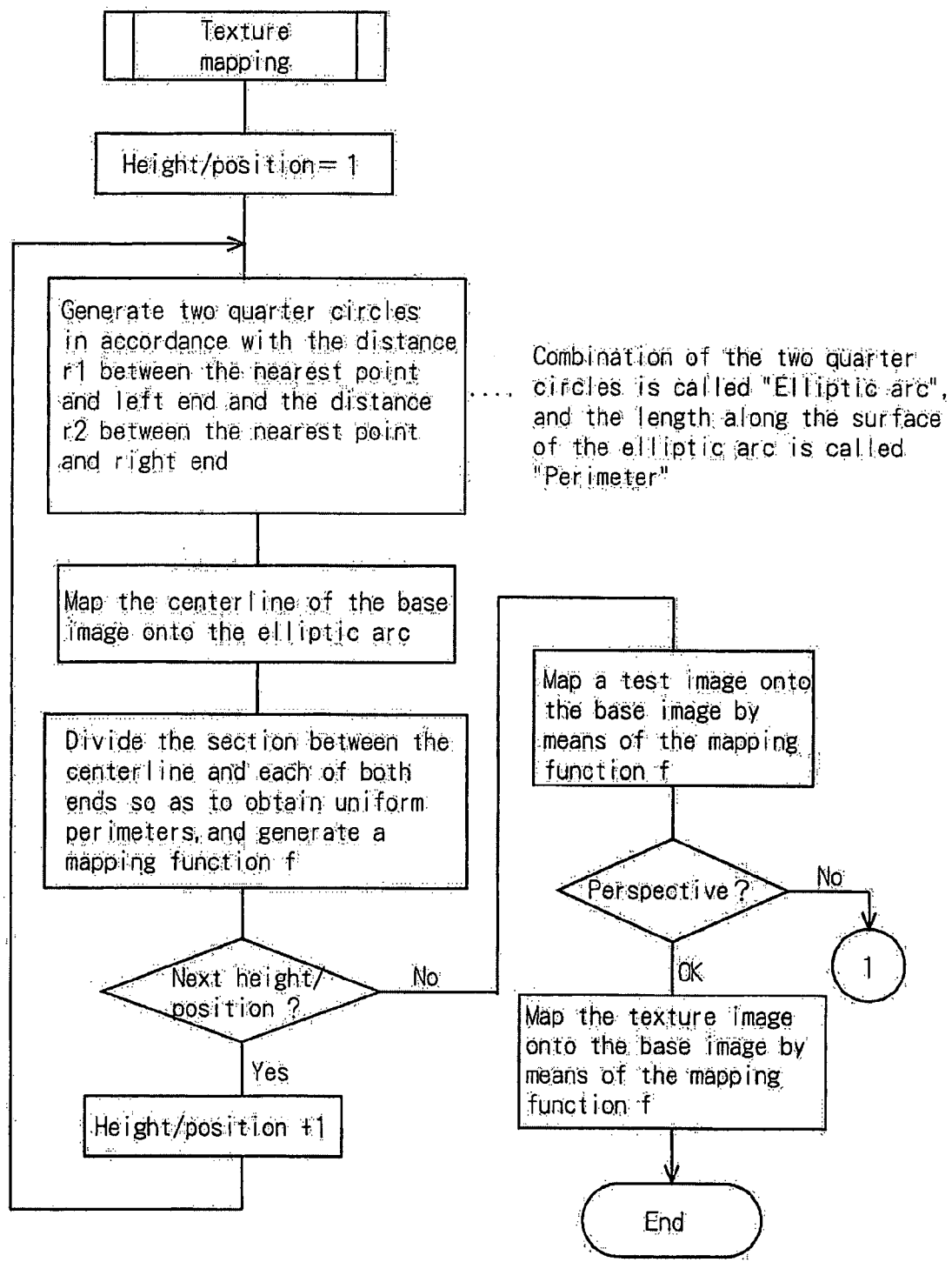
FIG. 4 is a flowchart showing an algorithm of texture mapping in the embodiment.

FIG. 4 shows an algorithm of texture mapping. The width of the mapping area and the mapping functions vary according to the height/position of the body, thus the following processing is performed for each position of the body. Suppose that the distance between the nearest point and the left end is r1 and the distance between the nearest point and the right end is r2. Then, a quarter circle having a radius, for example, the distance r1 and a quarter circle having a radius of the distance r2 are generated. A combination of the two quarter circles is called "elliptic arc", and the length along the surface of the elliptic arc is called "perimeter".

The elliptic arc is virtually superimposed on the base image, and a point in the vicinity of the centerline of the base image is mapped onto the vicinity of the centerline of the elliptic arc on the basis of the perimeter. Both ends of the base image originally correspond to predetermined positions such as both ends of the elliptic arc, thus the both ends of the base image have already been finished with mapping. Next, the section between a point in the vicinity of the centerline of the elliptic arc and each of the both ends is divided into a plurality of sections so that the perimeters of the divided sections become substantially equal to one another, and a mesh pattern is placed onto each divided section. Accordingly, mesh patterns are created in the elliptic arc, and the mapping function is defined for each mesh pattern by projecting these mesh patterns onto the base image. Projection here means drawing a perpendicular line from each point of the elliptic arc to the base image to match each point of the elliptic arc with a pixel of the base image. By interpolating the mapping function between the mesh patterns, a mapping function for mapping the texture image onto the base image is generated. The above-described processing is repeated for each height/position of the body.

The test image is mapped onto the base image by means of a mapping function f. The user uses the display or the like to perform evaluation as to whether the mapped image has appropriate perspective or not, and, if the perspective is not appropriate, the user returns to a flowchart connector 1 shown in FIG. 3 to input a nearest point or adjust the position of the both-end lines. If an appropriate perspective is obtained, the user maps the texture image onto the base image by means of the mapping function f.

Figure 5:
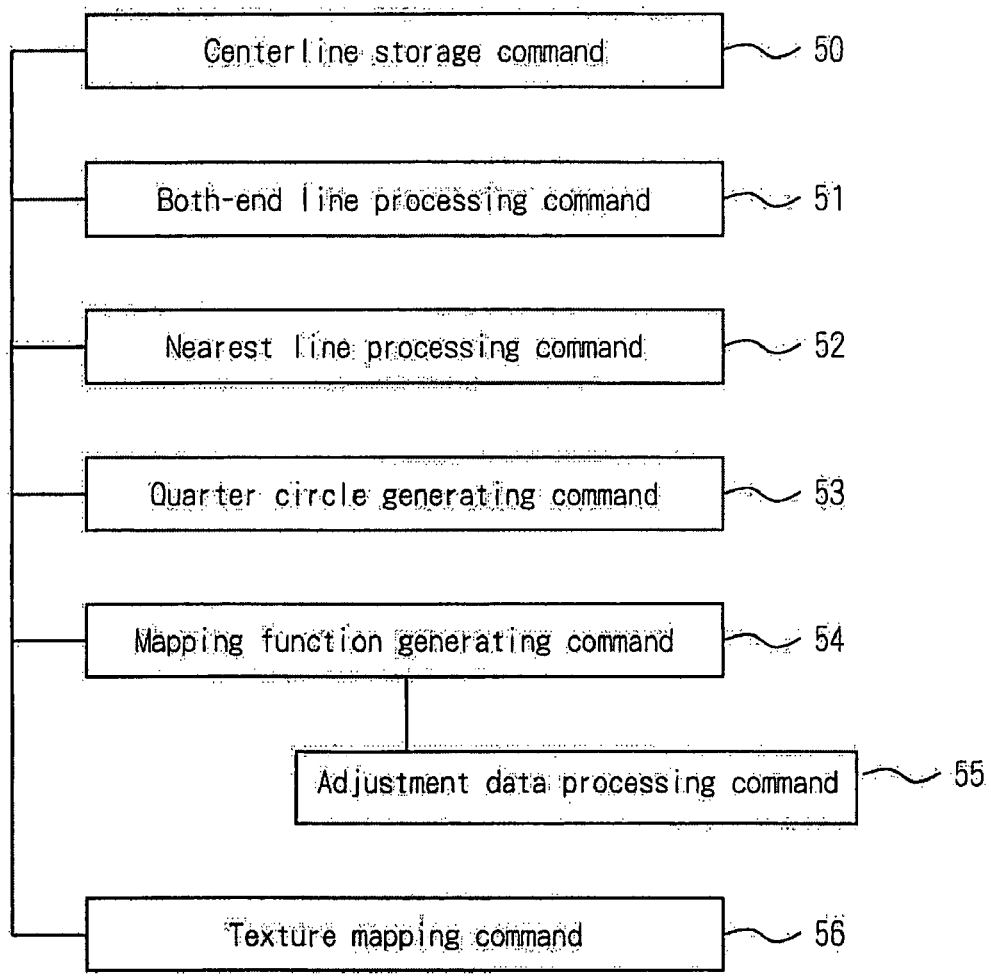
FIG. 5 shows an overview of a mapping program of the embodiment.

FIG. 5 shows an outline of the mapping program 19 of the present embodiment, wherein a centerline storage command 50 stores the centerlines of the texture image and the base image, while a both-end line processing command 51 generates both-end lines on the right and left sides of each centerline, receives deformation performed by the user, and stores the modified both-end lines. A nearest line processing command 52 uses the nearest point specified on the base image by the user, to extend this nearest point parallel to the centerline, and stores thus obtained line as the nearest line. A quarter circle generating command 53 generates and then stores two quarter circles that connect a position on the nearest line to the positions of both ends with respect to the height/position or right and left positions of the mapping area.

A mapping function generating command 54 maps the centerline and both-end lines of the base image onto the elliptic arc constituted by the two quarter circles, generates mesh patterns on both sides of the centerline so as to obtain substantially equal intervals along the perimeter of the elliptic arc, interpolates the space between the mesh patterns, and thereby generates a mapping function. Here, an adjustment data processing command 55 displays on the display the graphic user interfaces such as a slide bar and adjusts the degree of a change in the interval between the mesh patterns in terms of the mapping function, in accordance with the instruction value of the user. Specifically, when the user issues an instruction for reducing a change of the pixel density of the texture image when the texture image is mapped onto the base image, the interval between the mesh patterns on the base image is made uniform, or when the user issues an instruction for increasing the change of the pixel density, the interval between the mesh patterns on the base image is increased. A texture mapping command 56 uses the mapping function generated by the mapping function generating command 54, to map the texture image onto the mapping area on the base image.

Figure 6:
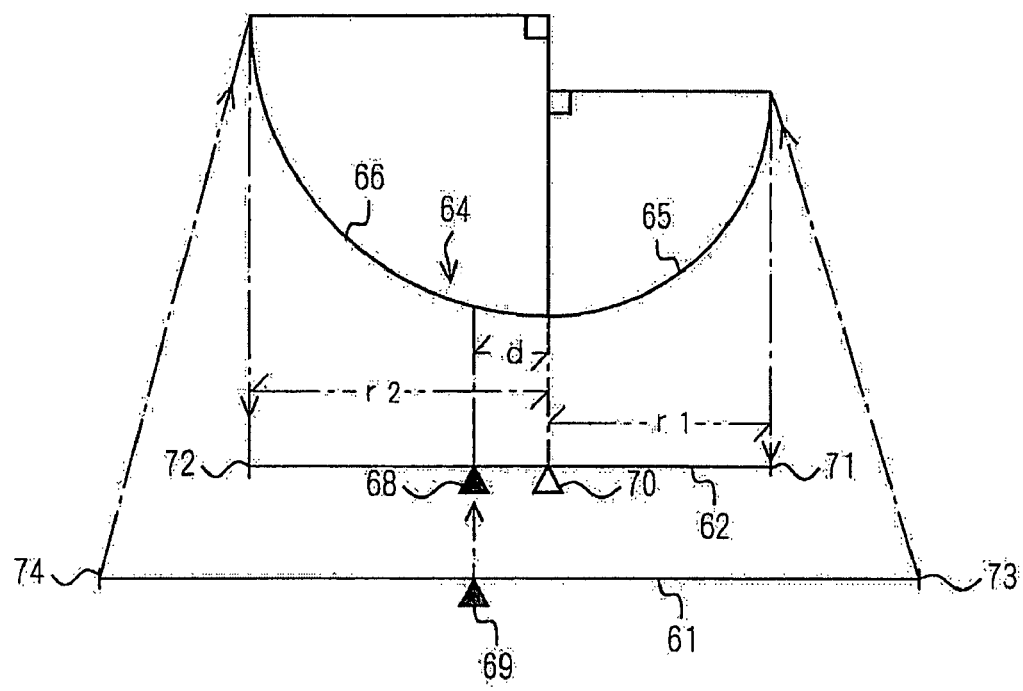
FIG. 6 is a figure showing a mechanism for generating an ellipse using a nearest point and both ends, wherein horizontal cross-sections of a texture image to be mapped onto a body and the base image onto which the texture image is mapped are shown along with an elliptic arc formed by two quarter circles for determining a mapping function.

FIG. 6 shows two quarter circles 65, 66 that are used in the present embodiment. 61 is a texture image, and 62 is a base image. The two quarter circles 65, 66, as a whole, form an elliptic arc 64, and the elliptic arc 64 has a perimeter that is approximately half of one ellipse. 68 is a centerline of the base image, which is inputted by the user. 69 is a centerline of the texture image, which may be inputted by the user or obtained by using the default value. 70 is the nearest point (a point on the nearest line) and is a value inputted by the user. 71 is the left side of the base image 62 of, for example, a body, and 72 is the right side of same. 73 is a left end of the texture image, and 74 is a right end of the texture image. The quarter circle 65 is an arc connecting the nearest point 70 and the left side 71, wherein the radius r1 is defined by the interval between the nearest point and the left side. The quarter circle 66 is an arc connecting the nearest point 70 and the right side 72, wherein the radius r2 is defined by the interval between the nearest point 70 and the right side 72. Furthermore, d is the interval between the centerline 68 and the nearest point 70 of the base image.

According to the mapping algorithm of the present embodiment, the texture image 61, the base image 62 and the elliptic arc 64 are superimposed on one another, to map a point on the centerline 68 onto the central position of the elliptic arc 64 that follows the surface of the base image 62, and to map points on the both sides 71, 72 onto both ends of the elliptic arc 64 respectively. Next, on the elliptic arc 64, the section between the position where the point on the centerline 68 is mapped and each of both ends is divided into a plurality of sections so that the perimeters of the obtained sections on the elliptic arc 64 become substantially equal to one another, and a mesh pattern is disposed on each divided section. Also, on the texture image 61, mesh patterns, the number of which is same as the one provided in the elliptic arc 64, are disposed at equal intervals. Consequently, a mapping function for mapping the texture image 61 onto the base image 62 is defined so that the pixel density of the section in the vicinity of the nearest point 70 on the texture image 61 is the lowest, while the pixel density in the vicinity of each of the both ends 73, 74 is the highest.

Figure 7:
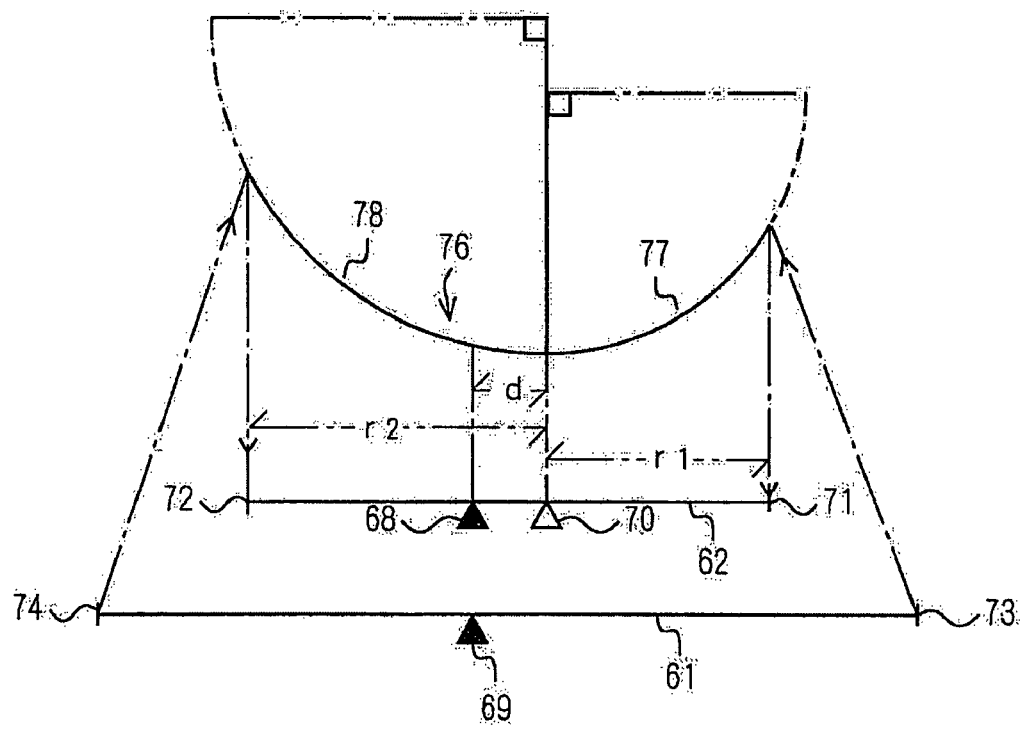
FIG. 7 shows a mechanism for generating an ellipse in a modified example; the idea of this figure is same as that of FIG. 6.

The quarter circles 65, 66 and the elliptic arc 64 in the present embodiment are used for mapping the texture image 61 onto the base image 62 with an appropriate perspective. Therefore, the positions of the centerlines 68, 69, nearest point 70 and both sides 71, 72 may be precise enough to appropriately express the perspective. Moreover, the shape of the elliptic arc 64 or the shape of the quarter circles 65, 66 may be approximate. FIG. 7 shows such an example, wherein a portion of each of two quarter circles 77, 78 of an elliptic arc 76 is used to make the change in the pixel density of the mapped texture image small, compared to the case shown in FIG. 6. In the case shown in FIG. 7, the quarter circles 77, 78 having radii larger than the distances r1, r2 are used in accordance with an instruction from the user to the slide bar.

Figure 8:
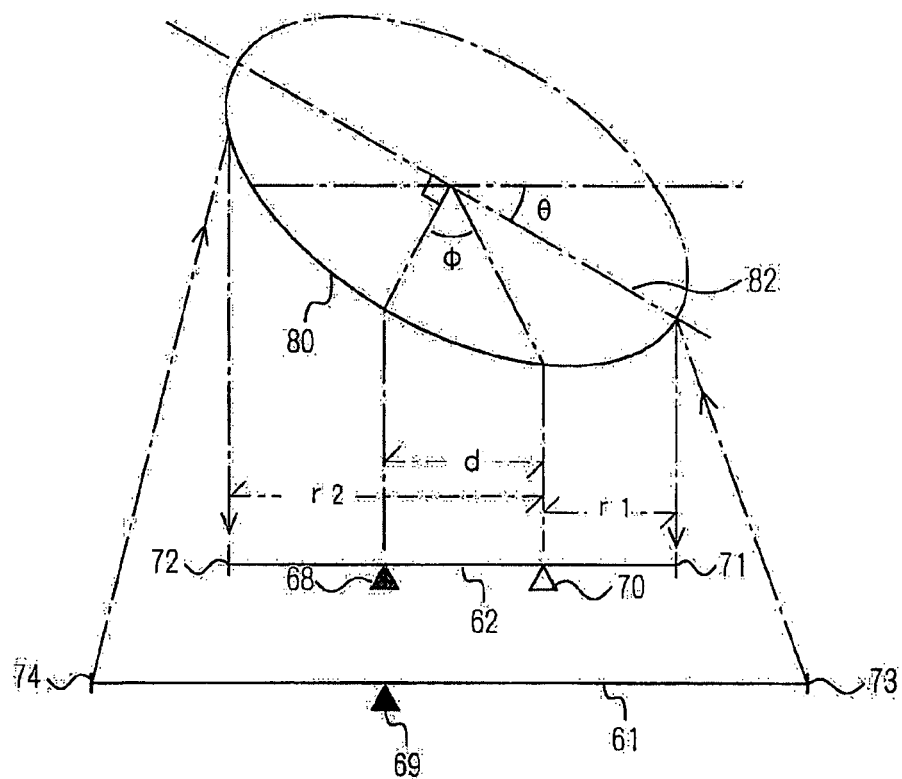
FIG. 8 is a mechanism for generating an ellipse in another modified example; the idea of this figure is same as that of FIG. 6.

The mapping is not necessarily performed only by using the quarter circles. As shown in the example of FIG. 8, 80 is an elliptic arc and 82 is a long axis thereof. Furthermore, $\theta$ is an angle formed by the long axis 82 and the texture image 61 or the base image 62, and $\phi$ is an angle defined by the distance d between the nearest point 70 and the centerline 68. The $\theta$ is defined by the d by means of the $\phi$ so that the larger the d the larger the $\phi$ becomes, and that the larger the $\phi$ the larger the $\theta$ becomes. The shape of the elliptic arc 80 is defined by means of the slide bar, thus, when reducing the change in the pixel density of the mapped texture image, the elliptic arc 80 is formed into an almost flat plate, and when increasing the change in the pixel density the elliptic arc 80 is formed into an almost perfect circle.

Figure 9:
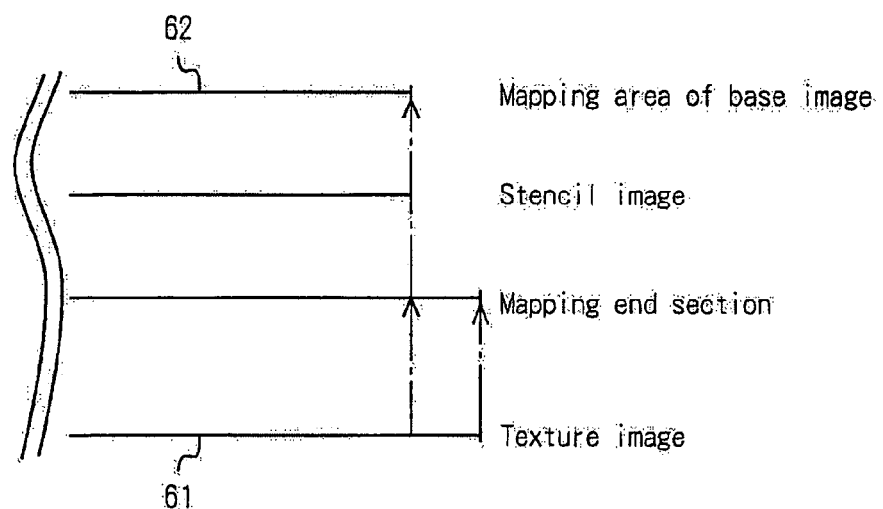
FIG. 9 shows an influence caused when the texture image protrudes out of the base image in the embodiment.
Figure 10:
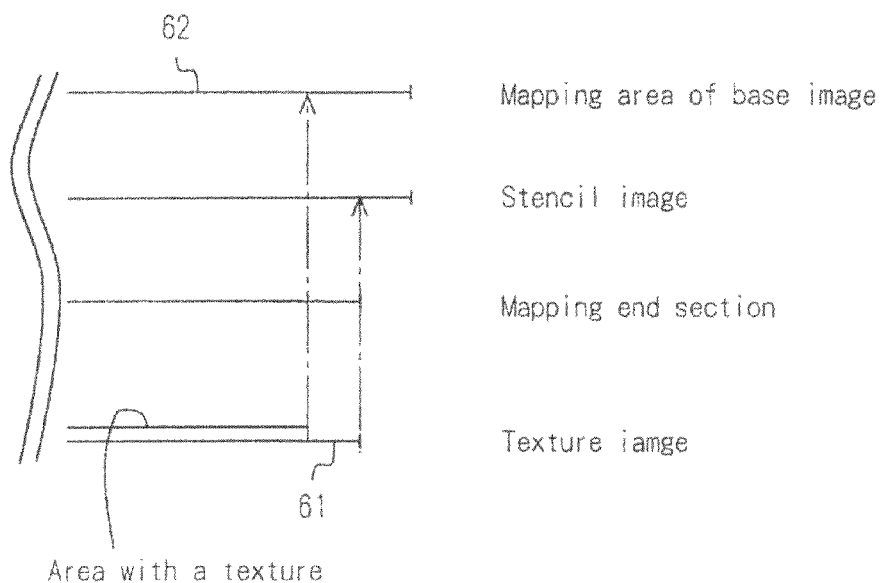
FIG. 10 shows an influence caused when the texture image is smaller than the base image in the embodiment.

The right and left ends of the texture image are not necessarily matched with both ends of the mapping area. As shown in the examples of FIG. 9 and FIG. 10, an end section of the texture image 61 protrudes out of the mapping area of the base image in FIG. 9. Here, for example, a stencil image is provided on the base image side so that the texture image is not mapped onto the outside of the mapping area.

In FIG. 10, the texture image 61 is smaller than the mapping area. Also, in this case, a texture exists only in a part of the texture image. The part having the texture passes through the stencil image and mapped onto the mapping area, while the other sections are not mapped by means of, for example, stencil, since these sections do not have textures.

Figure 11:
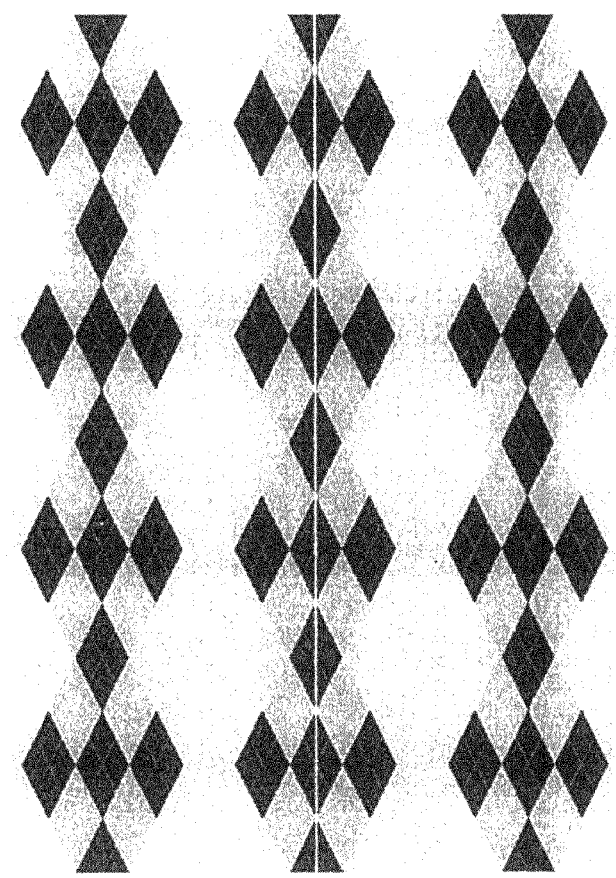
FIG. 11 shows an example of the texture image in which a centerline is inputted.
Figure 12:
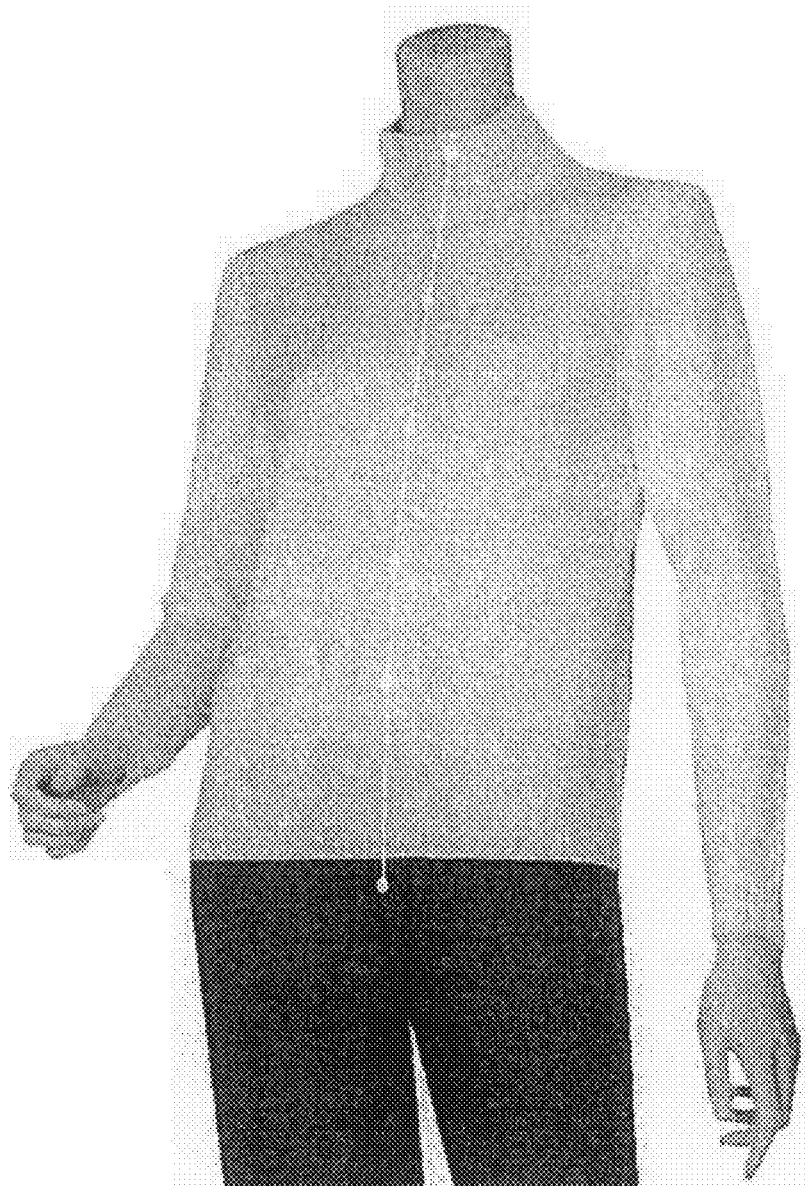
FIG. 12 shows an example of the base image in which a centerline is inputted.
Figure 13:
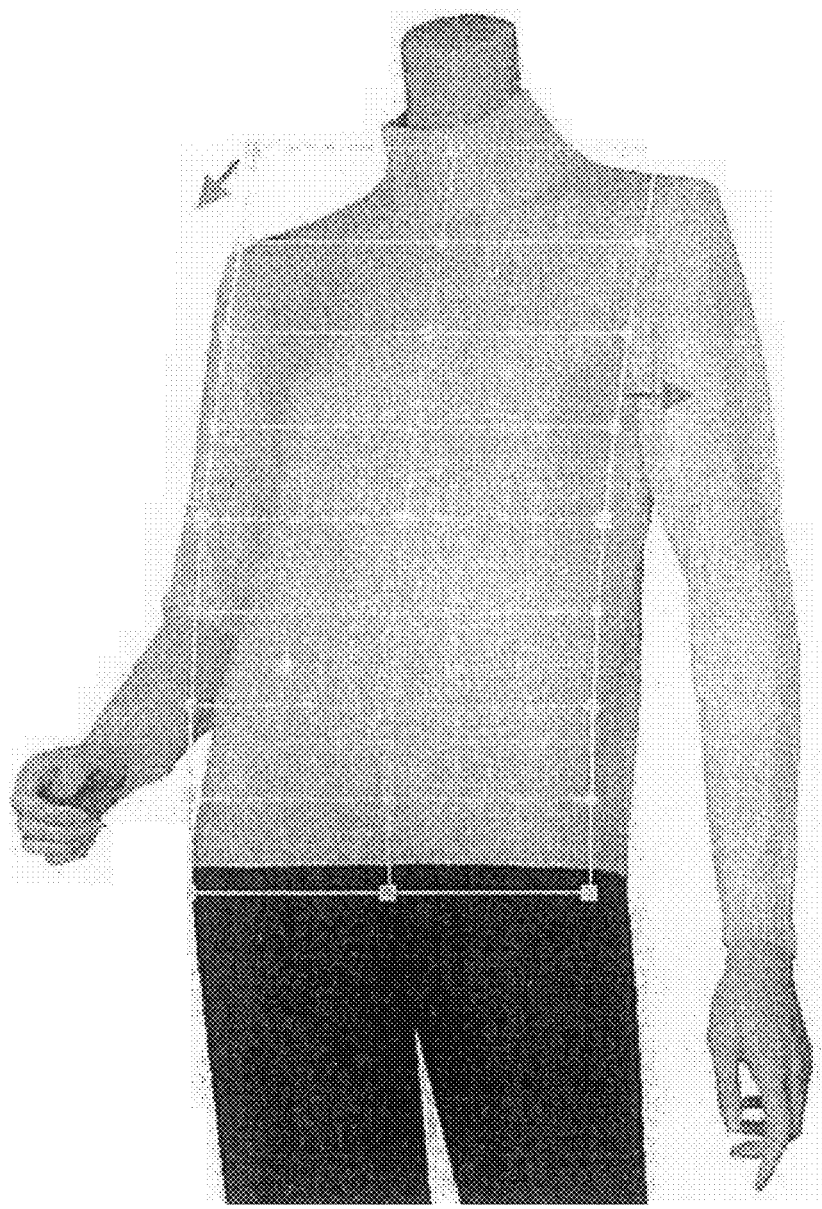
FIG. 13 shows an example of the base image in which both-end lines are inputted.
Figure 14:
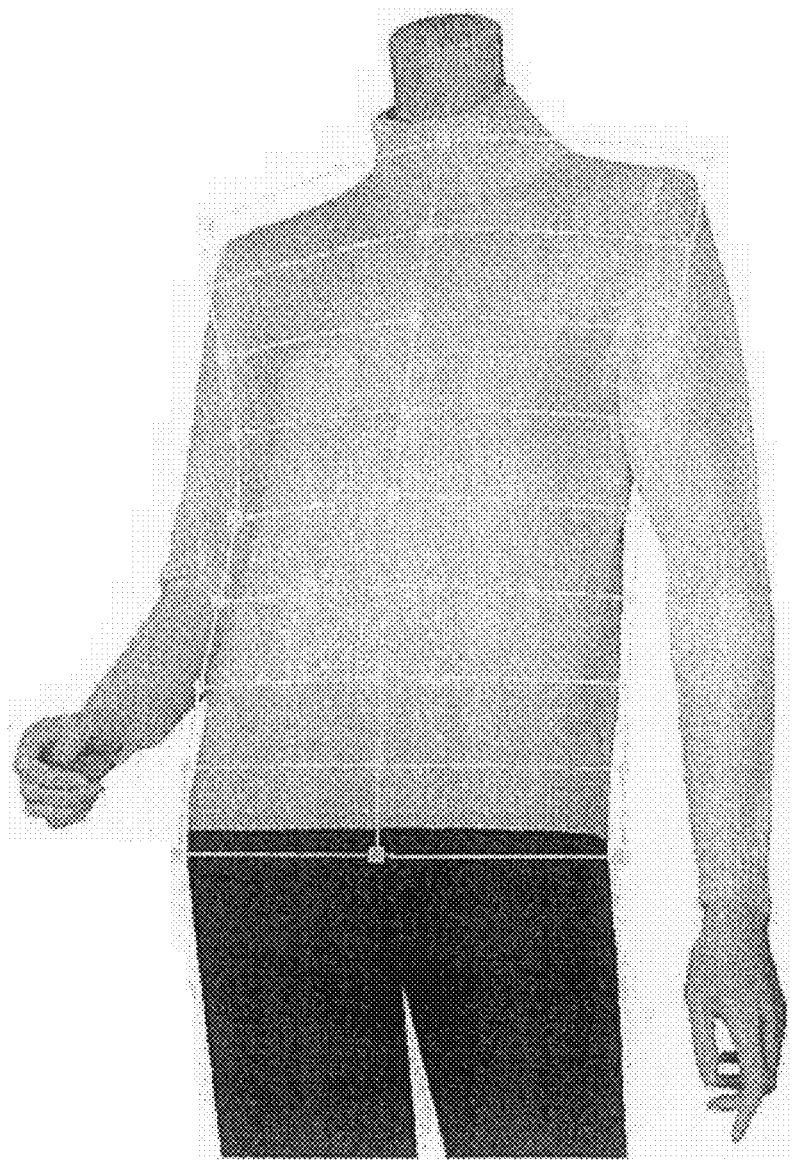
FIG. 14 shows an example of the base image obtained after deforming the both-end lines.

FIG. 11 through FIG. 17 each shows an example of texture-mapping a lattice design onto a body of a sweater. FIG. 11 shows a texture image in which a centerline is already inputted in a vertical direction along the centerline of the texture image. FIG. 12 shows a base image in which the front body of the sweater is the mapping area. When the user inputs marks, ○, a smooth centerline connecting these marks ○ is generated by means of spline conversion using the centerline storage unit 20. Next, as shown in FIG. 13, the both-end lines are formed on the right and left sides of the centerline so as to be, for example, in parallel with the centerline. The centerline and the right and left both-end lines are divided at equal intervals in a predetermined direction (e.g., vertical direction), and mesh patterns are generated. Intersecting points of the mesh patterns are shown in FIG. 13 with a mark ○ or □. As shown in FIG. 13, the both-end lines do not correspond to the right and left end sections of the front body, thus the user deforms the lines of the end sections by using the graphic input or the like. Specifically, each point may be blown up to deform the both-end lines. The both-end lines shown in FIG. 14 are already deformed and protrude out slightly from the both ends of the front body, but such deformation does not cause any problems.

Figure 15:
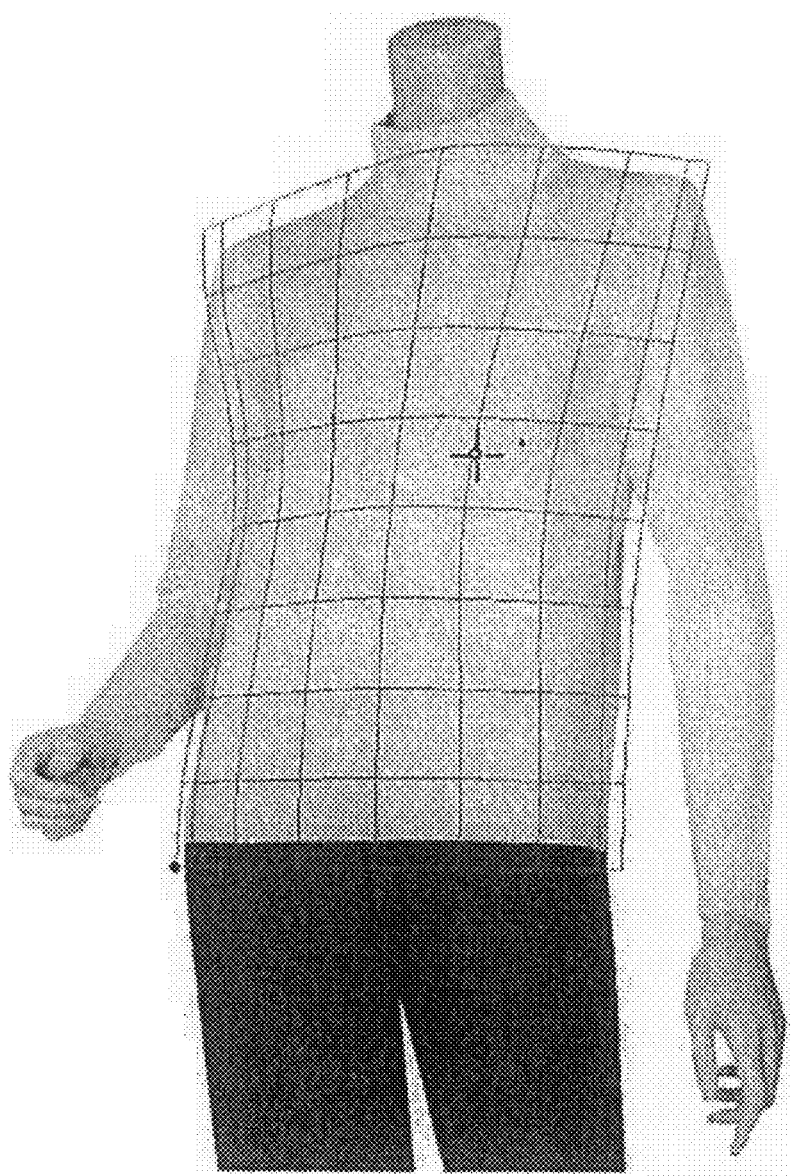
FIG. 15 shows an example of the base image obtained after inputting a nearest point.

In FIG. 15, the user inputs the nearest point and generates the mesh patterns on the mapping area. Once the nearest point is inputted by the user, the nearest point is extended parallel to the centerline. Then, the mesh patterns are generated in the manners shown in FIG. 6 and FIG. 7. The widths of the mesh patterns in the height direction are substantially uniform, but each point may be blown up, if necessary, to deform the widths of the mesh patterns in the height direction.

Figure 16:
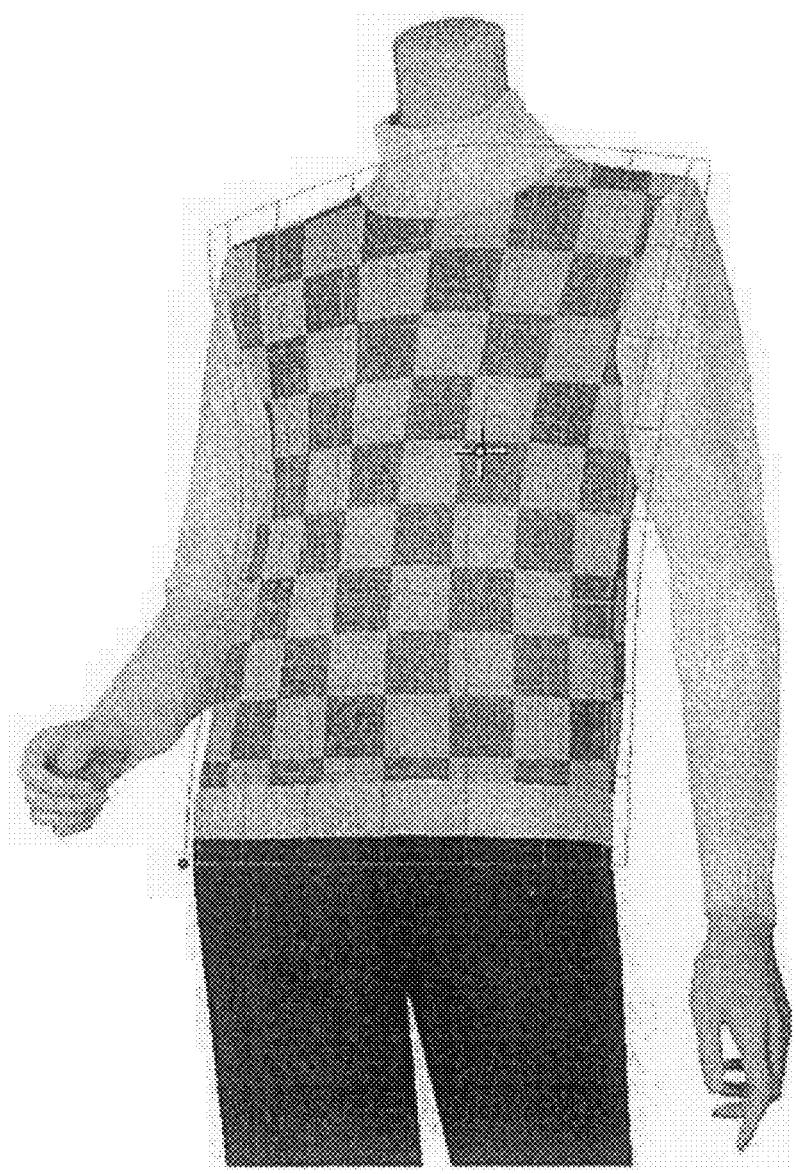
FIG. 16 shows an example an image obtained after mapping a text pattern.
Figure 17:
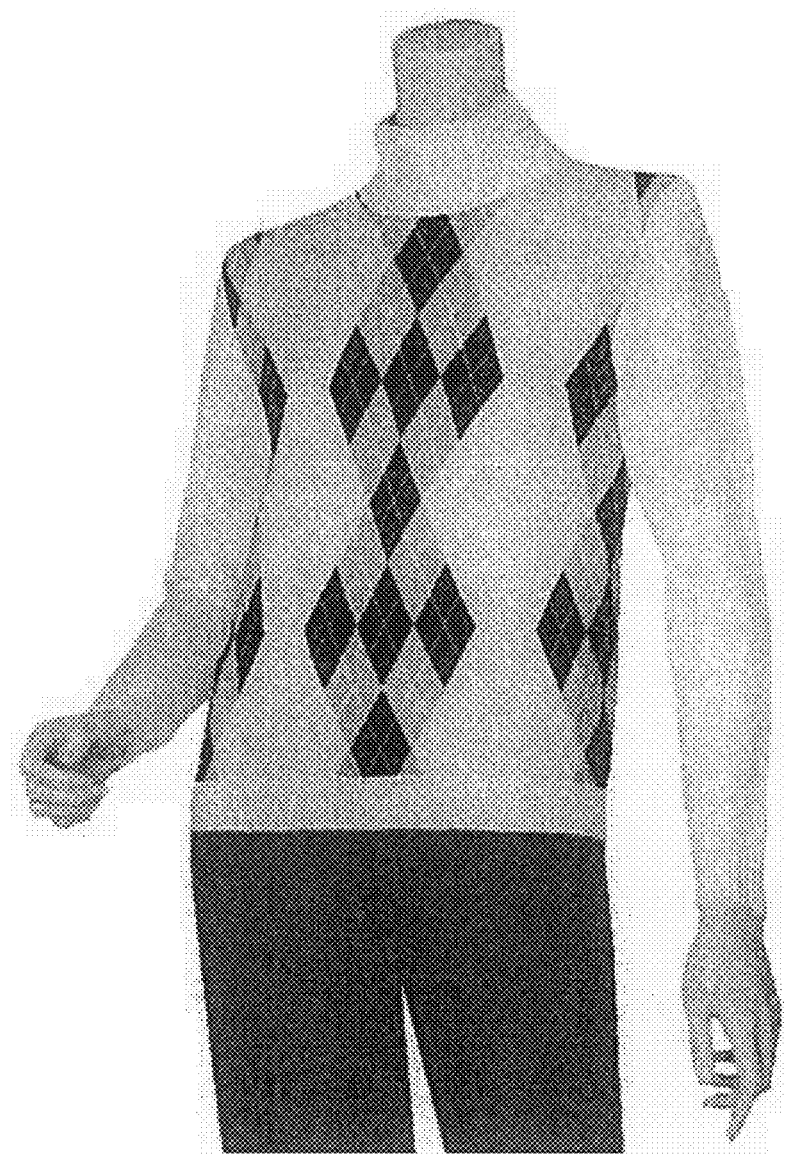
FIG. 17 shows an example of an image obtained after texture-mapping the texture image.

Once the mesh patterns are generated, mesh-mapping of the test image is performed as shown in FIG. 16. Although it is difficult to confirm the perspective in some texture images to be mapped, perspective of the mapped image can be confirmed easily by mapping the test image as shown in FIG. 16. The mapping is completed by texture-mapping a lattice pattern in the manner shown in FIG. 17.

It should be noted that a specific method for adjusting the mapping conditions is arbitrary. The mapping conditions can be adjusted by, for example, changing the curvature radii of the quarter circles 65, 66 or forming each quarter circle into a curve that resembles a parabolic curve or is close to a cubic curve. Moreover, the test image may be mapped only when the user issues an instruction. Also, in the case where the mapping area protrudes out of the front body and reaches the back body, a required section of an image of not only the front body but also the back body may be added to the texture image. Furthermore, the order of inputting or processing the centerline, both-end lines and nearest point is arbitrary.

In the present embodiment, texture mapping can be easily performed with a realistic perspective. The degree of the perspective can be easily corrected by using the adjustment data. Even in the case of a mapping image whose perspective cannot be found easily, mapping can be performed accurately by using a test image. Also, even if a human body or mannequin as the base of a base image does not face forward, mapping can be performed easily.

The invention claimed is:

1. A mapping device for generating a relationship between a mapping image and a base image as a mapping condition in order to map the mapping image onto the base image, and mapping the mapping image onto a mapping area of the base image by means of mapping means in accordance with the generated mapping condition, the mapping device comprising:

means for storing a centerline of the mapping area of the base image;

means for receiving and then storing at least one input of a nearest point that appears on the nearest side in the mapping area when viewed from a user of the mapping device;

means for obtaining positions of both ends of the mapping area; and mapping condition generating means for generating the mapping condition for mapping the mapping image onto the mapping area so that a pixel density of the mapping image becomes the lowest in the vicinity of the nearest point, that a centerline of the mapping image is mapped onto the vicinity of the centerline of the mapping area, and that the pixel density of the mapping image becomes the highest at the both ends, wherein the mapping condition generating means generates an elliptic arc such that the elliptic arc protrudes most toward the user's perspective in the vicinity of the nearest point, that the both ends of the mapping area are located on the farthest sides when viewed from the user side, and wherein the mapping condition generating means maps a point in the vicinity of the centerline of the mapping area onto the vicinity of the center of the elliptic arc, and generates a plurality of points for dividing the section between the mapped point in the vicinity of the centerline of the mapping area and each of both ends of the elliptic arc into a plurality of subsections so that perimeters of said plurality of subsections along the surface of the elliptic arc become constant.

2. The mapping device according to claim 1, further comprising means for extending the inputted nearest point by the length of the mapping area in parallel with the centerline of the mapping area, to obtain a nearest line.

3. The mapping device according to claim 1, further comprising means for inputting an instruction value for adjusting the rate of change in the pixel density obtained under the mapping condition.

4. The mapping device according to claim 1, further comprising storage means for storing a test image, wherein the mapping means maps the test image onto the mapping area in accordance with the generated mapping condition, before mapping the mapping image.

5. The mapping device according to claim 1, wherein a long axis of the elliptic arc is tilted toward a surface of the base image in accordance with an interval between the centerline of the mapping area and the nearest point.

6. The mapping device according to claim 1, wherein the elliptic arc is comprised of two circular arcs having different diameters, said two circular arcs connected in the vicinity of the nearest point.

7. A mapping method for generating a relationship between a mapping image and a base image as a mapping condition in order to map the mapping image onto the base image, and mapping the mapping image onto a mapping area of the base image by means of mapping means in accordance with the generated mapping condition, the mapping method comprising the steps of:

storing a centerline of the mapping area of the base image and at least one nearest point that appears on the nearest side in the mapping area when viewed from a user of the mapping device and obtaining positions of both ends of the mapping area; and generating the mapping condition for mapping the mapping image onto the mapping area so that a pixel density of the mapping image becomes the lowest in the vicinity of the nearest point, that a centerline of the mapping image is mapped onto the vicinity of the centerline of the mapping area, and that the pixel density of the mapping image becomes the highest at the both ends wherein the step of generating the mapping condition further comprises generating an elliptic arc such that the elliptic arc protrudes most toward the user's perspective in the vicinity of the nearest point, that the both ends of the mapping area are located on the farthest sides when viewed from the user side, and wherein the step of generating the mapping condition further comprises mapping a point in the vicinity of the centerline of the mapping area onto the vicinity of the center of the elliptic arc and generating a plurality of points for dividing the section between the mapped point in the vicinity of the centerline of the mapping area and each of both ends of the elliptic arc into a plurality of subsections so that perimeters of said plurality of subsections along the surface of the elliptic arc become constant.

8. A mapping program stored on a non-transitory computer storage medium to be executed by a mapping device for generating a relationship between a mapping image and a base image as a mapping condition in order to map the mapping image onto the base image, and mapping the mapping image onto a mapping area of the base image by means of mapping means in accordance with the generated mapping condition, the mapping program comprising:

a command for storing a centerline of the mapping area of the base image;

a command for receiving and then storing at least one input of a nearest point that appears on the nearest side in the mapping area when viewed from a user of the mapping device;

a command for obtaining positions of both ends of the mapping area; and a mapping condition generating command for generating the mapping condition for mapping the mapping image onto the mapping area so that a pixel density of the mapping image becomes the lowest in the vicinity of the nearest point, that a centerline of the mapping image is mapped onto the vicinity of the centerline of the mapping area, and that the pixel density of the mapping image becomes the highest at the both ends, wherein the mapping condition generating command further comprises generating an elliptic arc such that the elliptic arc protrudes most toward the user's perspective in the vicinity of the nearest point, that the both ends of the mapping area are located on the farthest sides when viewed from the user side, and wherein the mapping condition generating command also maps a point in the vicinity of the centerline of the mapping area onto the vicinity of the center of the elliptic arc, and generates a plurality of points for dividing the section between the mapped point in the vicinity of the centerline of the mapping area and each of both ends of the elliptic arc into a plurality of subsections so that perimeters of said plurality of subsections along the surface of the elliptic arc become constant.

* * * * *